US012679119B2

(12) United States Patent
Umehara

(10) Patent No.: US 12,679,119 B2
(45) Date of Patent: Jul. 14, 2026

(54) DRUM CONVEYANCE MECHANISM AND IMAGE FORMING APPARATUS

(71) Applicant: Shu Umehara, Kanagawa (JP)

(72) Inventor: Shu Umehara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 119 days.

(21) Appl. No.: 18/739,749

(22) Filed: Jun. 11, 2024

(65) Prior Publication Data

US 2024/0416665 A1 Dec. 19, 2024

(30) Foreign Application Priority Data

Jun. 19, 2023 (JP) ................................ 2023-100165

(51) Int. Cl.

| | |
|---|---|
| ***B41J 11/24*** | (2006.01) |
| ***B41J 13/00*** | (2006.01) |
| ***B41J 13/03*** | (2006.01) |
| ***B41J 13/08*** | (2006.01) |
| ***B41J 13/22*** | (2006.01) |

(52) U.S. Cl.

CPC .............. *B41J 13/08* (2013.01); *B41J 11/24* (2013.01); *B41J 13/0027* (2013.01); *B41J 13/03* (2013.01); *B41J 13/226* (2013.01)

(58) Field of Classification Search

CPC ........ B41J 13/08; B41J 11/24; B41J 13/0027; B41J 13/03; B41J 13/226

See application file for complete search history.

(56) References Cited

U.S. PATENT DOCUMENTS

2023/0131241 A1* 4/2023 Nakagaki .............. B65H 31/02 271/184

FOREIGN PATENT DOCUMENTS

| | | | | |
|---|---|---|---|---|
| JP | S60-114471 A | 6/1985 | | |
| JP | 2008238762 A | * 10/2008 | ............ B29C 65/00 |
| JP | 2012035976 A | * 2/2012 | ............... B65H 5/06 |
| JP | 2012-234068 A | 11/2012 | | |
| JP | 2022-154732 A | 10/2022 | | |

* cited by examiner

*Primary Examiner* — Yaovi M Ameh

(74) *Attorney, Agent, or Firm* — IPUSA, PLLC

(57) ABSTRACT

A drum conveyance mechanism includes a drum, a drive motor to rotate the drum to convey a sheet medium along an outer circumferential surface of the drum, a first power supply to supply an operating voltage to the drive motor, a driven roller to rotate as the drum rotates, a rotation brake to prevent rotation of the driven roller, a second power supply to supply an operating voltage to the rotation brake, and a power supply switch to switch a state of supply of the operating voltage from the first power supply and the second power supply.

6 Claims, 3 Drawing Sheets

DRUM CONVEYANCE MECHANISM AND IMAGE FORMING APPARATUS

CROSS-REFERENCE TO RELATED APPLICATION

This patent application is based on and claims priority pursuant to 35 U.S.C. § 119 (a) to Japanese Patent Application No. 2023-100165, filed on Jun. 19, 2023, in the Japan Patent Office, the entire disclosure of which is hereby incorporated by reference herein.

BACKGROUND

Technical Field

The present disclosure relates to a drum conveyance mechanism and an image forming apparatus.

Background Art

Drum conveyance mechanisms have been proposed that convey the medium along a drum-shaped member in an image forming apparatus that forms an image on a sheet recording medium. The image forming apparatus that includes the drum conveyance mechanism may be provided with an emergency shut-down key or button that instantly terminates the rotation of the drum-shaped member in case of an emergency. A drum stop mechanism that includes an emergency shut-down key or button is configured to cut off the power supply to a driving source such as a motor that supplies the drum-shaped member with rotational power when an operation such as touching or pressing down on the emergency shut-down key or button is detected.

For example, some technologies have been proposed to terminate the rotation of the drive motor when an operation for emergency stop is made. In such technologies, the electrostatic capacitor is connected to the drive motor with the reversed polarity such that the electrical charge of reversed voltage is applied to the motor, and force to rotate the motor in the reverse direction is applied to the drive motor.

SUMMARY

The present disclosure described herein provides a drum conveyance mechanism and an image forming apparatus. The drum conveyance mechanism includes a drum, a drive motor to rotate the drum to convey a sheet medium along an outer circumferential surface of the drum, a first power supply to supply an operating voltage to the drive motor, a driven roller to rotate as the drum rotates, a rotation brake to prevent rotation of the driven roller, a second power supply to supply an operating voltage to the rotation brake, and a power supply switch to switch a state of supply of the operating voltage from the first power supply and the second power supply. The image forming apparatus includes an image forming device to form an image on a sheet medium, and a conveyor to convey the sheet medium to the image forming device, and the conveyor includes the drum conveyance mechanism.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
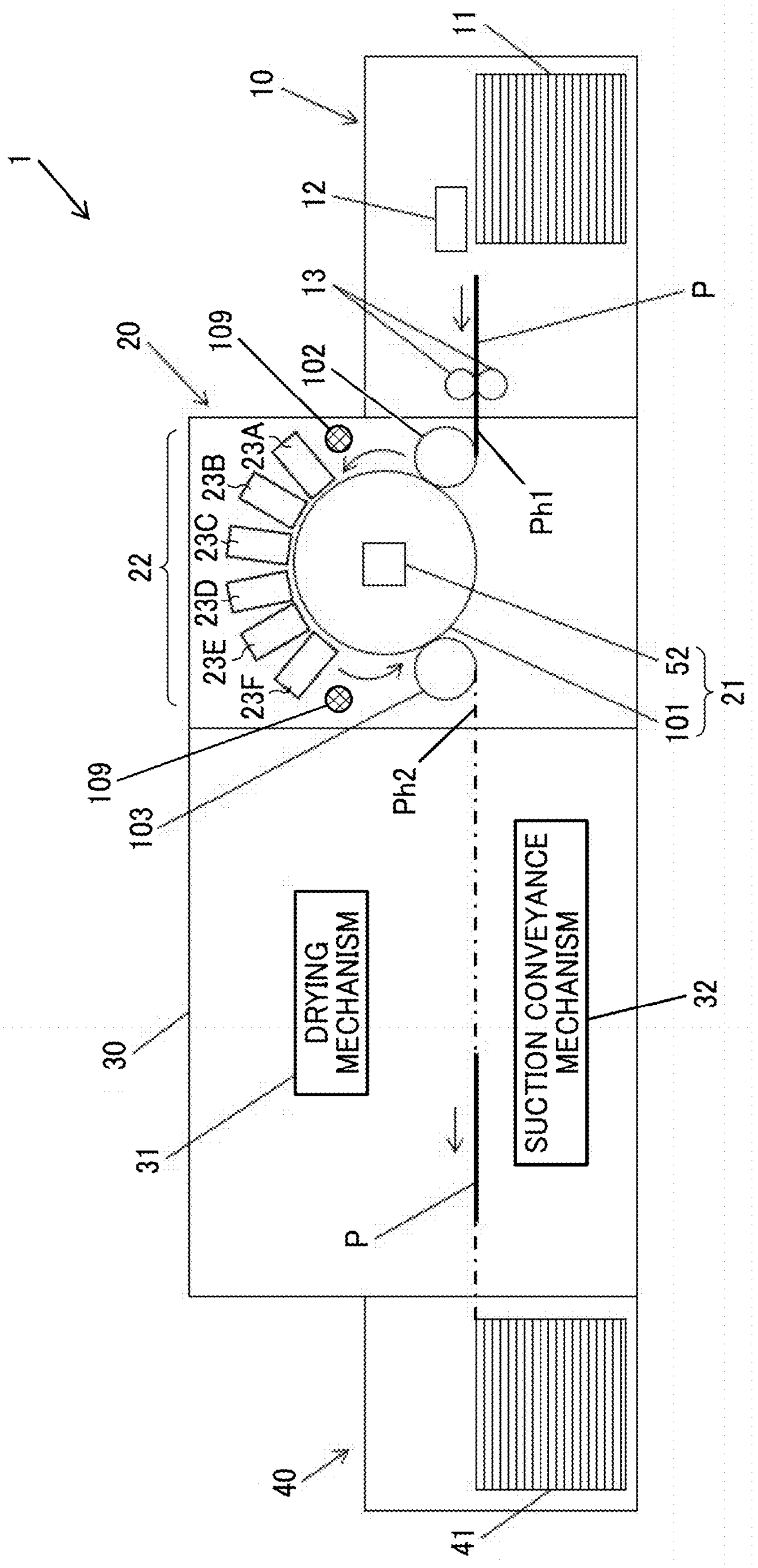
FIG. 1 is a schematic diagram of an inkjet recording apparatus that is an example of an image forming apparatus.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to limit the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

A drum conveyance mechanism and an image forming apparatus are described below with reference to the drawings.

FIG. 1 is a schematic diagram of an inkjet recording apparatus 1 that is an example of an image forming apparatus.

As illustrated in FIG. 1, the inkjet recording apparatus 1 includes a sheet loading unit 10, an image forming device 20, a drier unit 30, and a sheet ejection unit 40. In the inkjet recording apparatus 1, an image is formed as the image forming device 20 discharges ink to a sheet P that is an example of a sheet medium loaded through the sheet loading unit 10. In the inkjet recording apparatus 1, the ink that adheres to the sheet P is dried by the drier unit 30, and then the sheet P is ejected to the sheet ejection unit 40.

Inside the inkjet recording apparatus 1, an upstream conveyance path Ph1 and a downstream conveyance path Ph2 are formed. The upstream conveyance path Ph1 and the downstream conveyance path Ph2 indicate spaces through which the sheet P passes inside the inkjet recording apparatus 1. The upstream conveyance path Ph1 is a conveyance path from the loading unit 10 to the image forming device 20, upstream from the image forming device 20 in the conveyance direction of the sheet P. The downstream conveyance path Ph2 is a conveyance path from the image forming device 20 to the sheet ejection unit 40 through the drier unit 30, downstream from the image forming device 20 in the conveyance direction of the sheet P.

The conveyance direction of the sheet P is a direction from the sheet loading unit 10 to the sheet ejection unit 40 through the image forming device 20 and the drier unit 30, along the upstream conveyance path Ph1 and the downstream conveyance path Ph2, when the conveying drum 101 that is an example of the drum-shaped member is regarded as a center. The upstream conveyance path Ph1 and the downstream conveyance path Ph2 may extend linearly or may be curved in the conveyance direction of the sheet P. Alternatively, the upstream conveyance path Ph1 and the downstream conveyance path Ph2 may both extend linearly and be curved.

The sheet loading unit 10 is provided with a sheet loading tray 11 on which a plurality of sheets P are stacked, a feeder 12 that separates and feeds the sheets P on a one-piece-by-one-piece basis from the sheet loading tray 11, and a registration roller pair 13 that feeds the sheet P to the image forming device 20 through the upstream conveyance path Ph1. Any known feeder that has a function to feed a sheet or the like, such as a device with an air-suctioning function or a device with a roller or a rolling member, may be used as the feeder 12.

As the front end of the sheet P reaches the registration roller pair 13 and then the registration roller pair 13 is driven to rotate at a prescribed timing, the sheet P that is fed from the loading tray 11 to the upstream conveyance path Ph1 by the feeder 12 is conveyed to the image forming device 20. In the present embodiment, the sheet loading unit 10 is satisfactory as long as it has the function of feeding the sheet P to the image forming device 20, and no limitation is indicated thereby.

The image forming device 20 forms an image on the sheet P loaded through the sheet loading unit 10, and ejects the sheet P on which an image has been formed to the drier unit 30. The image forming device 20 includes a sheet conveyor 21 that conveys the sheet P, a liquid discharge device 22 that discharges liquid onto the sheet P conveyed by the sheet conveyor 21, and, and an upstream cylinder 102 and a downstream cylinder 103 that are arranged upstream and downstream from the conveying drum 101 and are examples of a driven roller. A mechanism that includes the upstream cylinder 102 and the downstream cylinder 103 arranged around the conveying drum 101 to face each other is an example of the drum conveyance mechanism.

The sheet conveyor 21 includes the conveying drum 101 that bears the sheet P on its peripheral surface and rotates on the axis, and a suction device 52 that is a means for causing the peripheral surface of the conveying drum 101 to perform suctioning. The upstream cylinder 102 receives the sheet P from the sheet loading unit 10, and passes the sheet P to the conveying drum 101. The downstream cylinder 103 receives the sheet P on which an image has been formed from the conveying drum 101 and passes the sheet P to the drier unit 30.

The front end of the sheet P, which is conveyed from the sheet loading unit 10 to the image forming device 20, is gripped by a gripper arranged on the surface of the upstream cylinder 102, and the sheet P is conveyed as the surface of the upstream cylinder 102 moves. The sheet P that is conveyed by the upstream cylinder 102 is passed to the conveying drum 101 at a position facing the conveying drum 101.

The conveying drum 101 is also provided with a gripper on its surface, and the front end of the sheet P is gripped by the gripper. Suction holes are formed on the surface of the conveying drum 101 in a distributed manner. At each of the suction holes, sucking airflow toward the inside of the conveying drum 101 is generated by the suction device 52. The sheet P is sucked up and borne onto the surface of the conveying drum 101 by the suction airflow. The front end of the sheet P, which is passed from the upstream cylinder 102 to the conveying drum 101, is gripped by the gripper, and the sheet P is sucked up and borne onto the conveying drum 101 by the suction airflow and is conveyed as the surface of the conveying drum 101 moves.

The liquid discharge device 22 includes discharge units 23 (including discharge units 23A to 23F) each of which is an example of a liquid discharger. For example, the discharge unit 23A, the discharge unit 23B, the discharge unit 23C, and the discharge unit 23D discharge a liquid of cyan (C), a liquid of magenta (M), a liquid of yellow (Y), and a liquid of black (K), respectively. The discharge units 23E and 23F are used to discharge liquids of one of yellow (Y), magenta (M), cyan (C), and black (K) or special colors such as white, gold, and silver. Further, the liquid discharge device 22 may include discharge units that discharge treatment liquid such as liquid used for surface coating.

The discharge units 23A to 23F are, for example, full-line heads in which liquid discharge units having rows of nozzles are arrayed on the base. The liquid discharge units may be referred to simply as heads in the following description. The discharging operation of each of the discharge units 23A to 23F is controlled by the driving signals that are based on the image data. When the sheet P that is conveyed by the conveying drum 101 passes through the space facing the liquid discharge device 22, inks of different colors are discharged from the nozzles arranged on the bottom faces (nozzle faces) of the discharge units 23A to 23F. By so doing, an image is formed on the sheet P based on the image data.

In the present embodiment, the image forming device 20 is satisfactory as long as it has a function to make liquid adhered to the sheet P to form an image thereon, and a configuration or structure of the image forming device 20 to discharge liquid or make the liquid adhered to a recording medium such as the sheet P is not limited to any particular configuration or structure.

The sheet P that is conveyed by the conveying drum 101 is passed to the downstream cylinder 103 at a position facing the conveying drum 101. In other words, the sheet P on which an image is formed by the image forming device 20 is passed to the downstream cylinder 103 at a position facing the conveying drum 101. More specifically, the front end of the sheet P is gripped by a gripper arranged on the surface of the downstream cylinder 103, and the sheet P is conveyed as the surface of the downstream cylinder 103 moves. Under such conditions, the surface of the sheet P on which the image is formed faces the downstream cylinder 103. In other words, the inner side of the sheet P conveyed along the curved conveyance path faces the downstream cylinder 103. The sheet P that is conveyed by the downstream cylinder 103 is passed to the drier unit 30 through the downstream conveyance path Ph2.

As described above, the upstream conveyance path Ph1 and the downstream conveyance path Ph2 of the sheet P are formed linearly in the conveyance direction, and each portion along the outer circumferential surface of the conveying drum 101 is an example of a conveyance path that is curved in the conveyance direction.

On the outer surface of the housing including the image forming device 20, an emergency shut-down switch 109 to terminate the rotation of the conveying drum 101 at any desired timing is arranged. As illustrated in FIG. 1 by way of example, the emergency shut-down switch 109 is arranged at a position where a user can easily operate. The emergency shut-down switch 109 may be arranged at a plurality of positions.

The drier unit 30 is provided with a drying mechanism 31 and a suction conveyance mechanism 32. The drying mechanism 31 dries the ink that adheres to the sheet P in the image forming device 20. The suction conveyance mechanism 32 conveys the sheet P that is passed from the downstream cylinder 103 to the sheet ejection unit 40 along the downstream conveyance path Ph2. In other words, the sheet P that is conveyed from the image forming device 20 through the downstream cylinder 103 is received by the suction conveyance mechanism 32, and then is conveyed by the suction conveyance mechanism 32 so as to pass through the drying mechanism 31 and be passed to the sheet ejection unit 40. When the sheet P passes through the drying mechanism 31, the ink on the sheet P goes through a drying operation. Accordingly, liquid components such as moisture in the ink evaporate, and the ink on the sheet P is fixed. Moreover, the sheet P is prevented from being curled.

The sheet ejection unit 40 is provided with an output tray 41 on which a plurality of sheets P are stacked. The sheets P that are conveyed from the drier unit 30 by the suction conveyance mechanism 32 are sequentially stacked and held on the output tray 41 in order and held. In the present embodiment, the sheet ejection unit 40 is satisfactory as long as it has the function of ejecting the sheets P, and no limitation is intended thereby.

As described above, the inkjet recording apparatus 1 includes the sheet loading unit 10, the image forming device 20, the drier unit 30, and the sheet ejection unit 40. However, other functional units may be added as appropriate. For example, the inkjet recording apparatus 1 may be provided with a preprocessor that performs pre-processing of image formation between the sheet loading unit 10 and the image forming device 20 or a postprocessor that performs post-processing of image formation between the drier unit 30 and the sheet ejection unit 40.

An example of the preprocessor performs a treatment-liquid applying operation to apply treatment liquid to the sheet P so as to prevent smearing by reacting with ink. However, what is done by preprocessing is not limited to any particular processing. The functions of the postprocessor include, for example, sheet reverse conveyance processes in which an image is formed by the image forming device 20 and the sheet P is reversed and sent to the image forming device 20 again to form images on both sides of the sheet P, or a process for binding a plurality of sheets P on which images are formed. However, what is to be done by the postprocessor is not limited to any particular function.

In the present embodiment, the inkjet recording apparatus 1 is described as an example of an image forming apparatus. However, the image forming apparatus is satisfactory as long as it is provided with a liquid discharge unit that discharges the liquid toward the surface of a sheet to be dried, and is not limited to an apparatus or unit in which an image with some meaning such as a text or figure is visualized by discharged liquid droplets. Alternatively, the image forming apparatus may be an apparatus that forms patterns or the like having no meaning in itself.

The material of such a medium is not limited and may be any material to which liquid can adhere even temporarily such as paper, thread, fiber, fabric, leather, metal, plastic, glass, wood, or ceramic. The medium may be any of the materials used for film products, cloth products such as clothes, construction materials, such as wallpaper and flooring, and leather products. In the present embodiment, a material to which liquid can adhere even temporarily is referred to as a medium. A concrete example of the ink droplets is not limited to the ink discharged from the liquid discharge device 22, and may be any liquid such as a treatment liquid used in the preprocessor. In other words, the embodiments of the present disclosure can be applied to any ink-droplet discharging devices that drop ink droplets at desired positions.

The discharge head is a functional component that discharges or sprays liquid through the discharge orifices of a nozzle. As a source that generates energy to discharge liquid, means for generating energy for discharge can be used such as a piezoelectric actuator, a thermal actuator including an electrothermal conversion element such as a heat element, and an electrostatic actuator including a diaphragm and a counter electrode. The means for generating energy for discharge to be adopted and used is not limited to the above-described examples.

Figure 2:
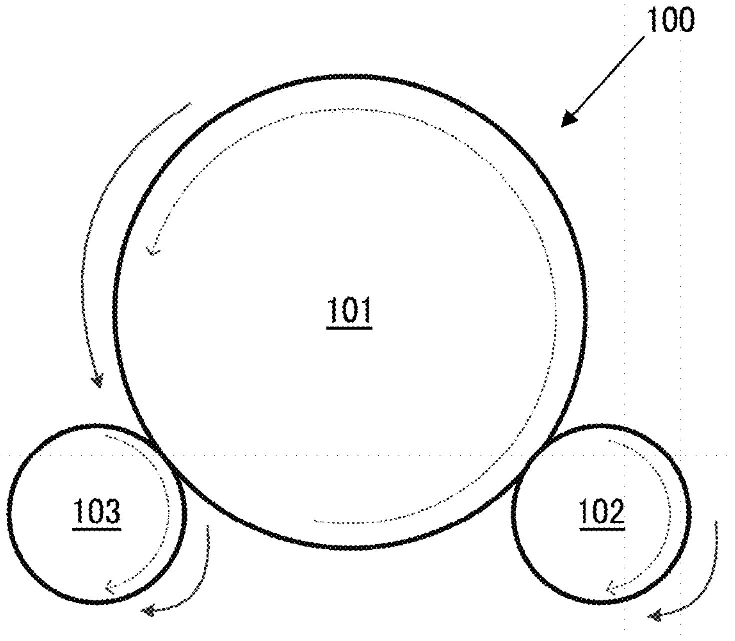
FIG. 2 is a schematic diagram of a medium conveyance unit that is an example of a drum conveyance mechanism.

FIG. 2 is a schematic diagram of a medium conveyance unit 100 that is an example of a drum conveyance mechanism.

As illustrated in FIG. 2, the medium conveyance unit 100 includes the conveying drum 101, the upstream cylinder 102 arranged at a position where the conveying drum 101 faces the upstream conveyance path Ph1, and the downstream cylinder 103 arranged at a position where the conveying drum 101 faces the downstream conveyance path Ph2.

The conveying drum 101 has means for gripping the front end of the sheet Pin the conveyance direction, which is conveyed from an upstream portion of the inkjet recording apparatus 1, on the outer circumferential surface, and conveys the gripped sheet P by the rotation of the conveying drum 101.

Both the upstream cylinder 102 and the downstream cylinder 103 are configured to rotate in synchronization with the rotation of the conveying drum 101. For example, a driven gear, which is to engage with the drive gear arranged at the rotation axis of the conveying drum 101, is fixed to the rotation axis of each of the upstream cylinder 102 and the downstream cylinder 103. As the conveying drum 101 is driven to rotate by the rotation of a drive motor that is an example of a driving source, the drive gear starts rotating when the conveying drum 101 starts rotating. Further, as the driven gear is rotated according to the rotation of the drive gear, the upstream cylinder 102 and the downstream cylinder 103 are driven to rotate. In other words, the upstream cylinder 102 and the downstream cylinder 103 is an example of a driven roller that rotates in synchronization with the rotation of the conveying drum 101, which is an example of a drive roller.

The upstream cylinder 102 and the downstream cylinder 103 that are driven to rotate in synchronization with the conveying drum 101, which is an example of the drive roller, stop rotating in synchronization with the termination of the rotation of the conveying drum 101. On the other hand, the rotation of the conveying drum 101 can be stopped by the termination of the rotation of the upstream cylinder 102 and the downstream cylinder 103 when the driving force is lost and the conveying drum 101 rotates through inertia. In other words, each of the upstream cylinder 102 and the downstream cylinder 103 also serves as a braking mechanism that prevents the rotation of the conveying drum 101.

Control blocks to control the rotation of the conveying drum 101 are described below. The conveying drum 101 is configured to rotate by the drum drive motor 108 that is driven to rotate in response to the application of the operating voltage supplied from the power supply 104.

Figure 3:
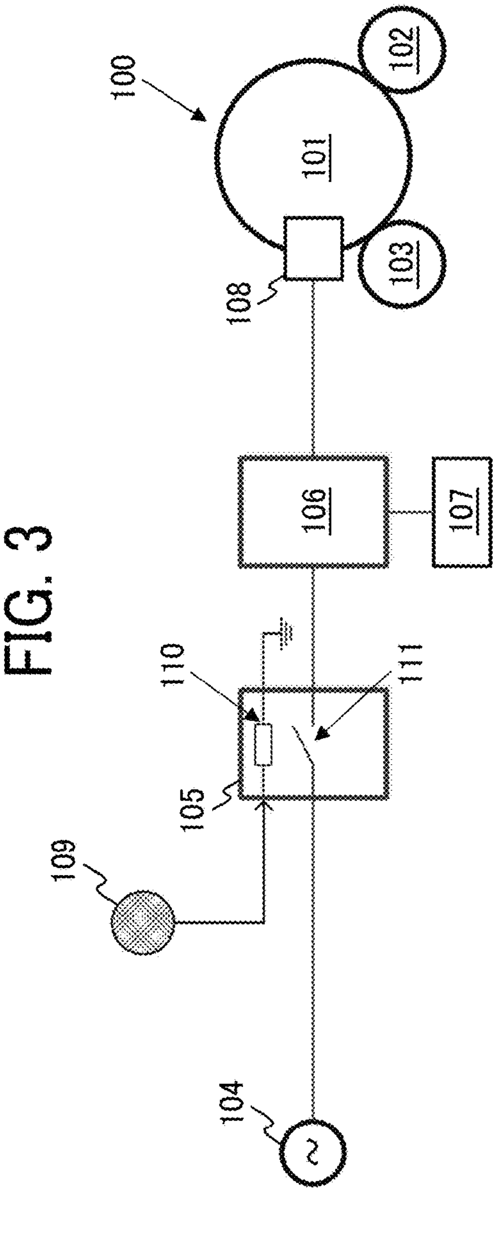
FIG. 3 is a diagram of control blocks to control the operation of a drum conveyance mechanism according to a comparative example.

Before describing embodiments of the present disclosure in detail, drive control blocks according to a comparative example are described below with reference to FIG. 3. As illustrated in FIG. 3, the alternating voltage from the power supply 104, which is an example of an alternating-current (AC) power supply, is supplied to the drum drive motor 108, which is an example of a driving source to supply driving force for rotation to the conveying drum 101, through the motor driver 106. The drum drive motor 108 is not limited to an alternating-current (AC) motor, and may be any motor as long as the rotation of the conveying drum 101 can be controlled in response to the control made by a control circuit 107 as will be described later in detail.

The motor driver 106 controls the operation of the drum drive motor 108 based on the control signal sent from the control circuit 107.

The control circuit 107 executes a control program to output a control signal to the motor driver 106. By so doing, predetermined controls are implemented. The control circuit 107 outputs a desired control signal in view of the operating conditions of the motor driver 106.

Between the motor driver 106 and the power supply 104, an electromagnetic contactor 105 is arranged. In other words, the state of supply of the operating voltage from the power supply 104 to the drum drive motor 108 is switched by the electromagnetic contactor 105.

The electromagnetic contactor 105 that is an example of a power supply switch is provided with an a-contact switch 111 that is an example of a switch and switches between supply and interruption of the operating voltage from the power supply 104 to the motor driver 106. The a-contact switch 111 is closed when the coil 110 provided for the electromagnetic contactor 105 is energized, and is open when the coil 110 is nonenergized.

The energization of the coil 110 provided for the electromagnetic contactor 105 is switched depending on the state of the emergency shut-down switch 109. An operation input such as touching or pressing down of the emergency shut-down switch 109 is referred to as an external input, and the coil 110 is energized when no external input is present. When an external input is made through the emergency shut-down switch 109, the coil 110 is nonenergized. In other words, the excitation state of the coil 110 is switched through the operation made on the emergency shut-down switch 109.

When the emergency shut-down switch 109 is not touched or pressed down under normal operating conditions, the coil 110 provided for the electromagnetic contactor 105 is energized, and the a-contact switch 111 inside the electromagnetic contactor 105 is closed. Under such conditions, the voltage from the power supply 104 is supplied to the motor driver 106, and the drum drive motor 108 rotates to drive the conveying drum 101 to rotate. In other words, when the emergency shut-down switch 109 is not touched or pressed down, the a-contact switch 111 is in a state of supply, which is an example of a first state, where the operating voltage from the power supply 104 that is an example of a first power supply is supplied to the drum drive motor 108.

Technical problems expected in control blocks with the above configuration or structure are described below. For example, when abnormalities in the operation of control software operating in the control circuit 107 are detected and control signals from the control circuit 107 to the motor driver 106 become unstable and unintended continuous driving occurs, the control of the drum drive motor 108 may be lost.

In the present comparative example, a situation is assumed in which a user touches or presses down the emergency shut-down switch 109 in order to deactivate the rotation of the conveying drum 101 in the related art described as above with reference to FIG. 3. In such cases, the coil 110 provided for the electromagnetic contactor 105 is nonenergized. Accordingly, the a-contact switch 111 opens, and the supply of voltage from the power supply 104 to the drum drive motor 108 is interrupted. As a result, the driving force of the drum drive motor 108 is lost, and the conveying drum 101 loses its driving force to rotate. Accordingly, the rotation speed of the conveying drum 101 decreases over time, and the conveying drum 101 eventually stops rotating.

However, the rotation of the conveying drum 101 has some degree of inertia. For this reason, it is difficult to stop the conveying drum 101 immediately after the emergency shut-down switch 109 is touched or pressed down, and the conveying drum 101 may continue to rotate for certain length of time.

Even when the emergency shut-down switch 109 is touched or pressed down to interrupt the driving voltage, the residual electric charge remaining in the electrostatic capacitors provided for the motor driver 106 may be supplied to the drum drive motor 108 to continue the rotation. In view of such circumstances, even if the emergency shut-down switch 109 is touched or pressed down, undesired rotation of the conveying drum 101 continues for a while. In other words, in the related art, even if the emergency shut-down switch 109 is touched or pressed down, the conveying drum 101 cannot instantly be stopped and may rotate slightly.

As described above, in the related art, even if the emergency shut-down switch 109 is touched or pressed down, the rotation of the conveying drum 101 continues for a while until the conveying drum 101 stops rotating completely, and instant termination is difficult. The drive control blocks of the conveying drum 101 according to the present embodiment can prevent the continuation of rotation as in the comparative example after an operation is made to terminate the rotation of a drum, and can instantly terminate the rotation of the conveying drum 101 when the emergency shut-down switch 109 is manipulated.

Figure 4:
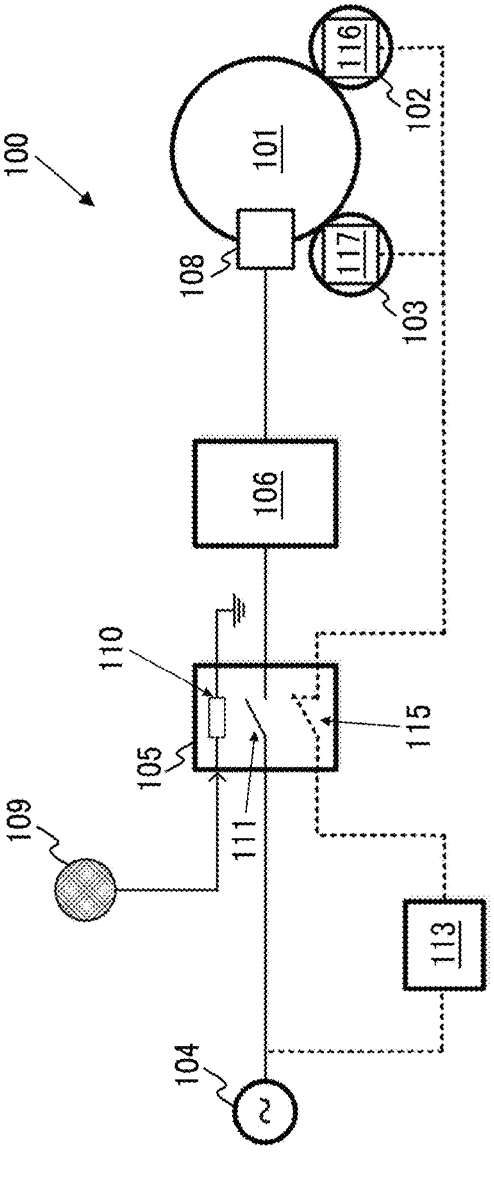
FIG. 4 is a diagram of control blocks to control the operation of the drum conveyance mechanism of FIG. 2.

FIG. 4 is a diagram of control blocks to control the operation of the medium conveyance unit 100.

As illustrated in FIG. 4, the control blocks according to the present embodiment have some configurations similar to those of the comparative example, and configurations that are different from those of the comparative example are described below. The drive control blocks according to the present embodiment are not influenced by the interruption or cut off of the power due to an external input such as the operation made on the emergency shut-down switch 109, and include a second power supply 113 that is an example of a second power supply and is different from the power supply 104 that is an example of the first power supply.

The second power supply 113 is, for example, a switching power supply, and converts the alternating voltage supplied from the power supply 104 into, for example, a direct-current voltage of 24 volts (V) for supply. The second power supply 113 is arranged between the power supply 104 and the electromagnetic contactor 105, and converts the input from the power supply 104 and outputs the converted input to the electromagnetic contactor 105.

The output voltage of the second power supply 113 is input to the b-contact switch 115 arranged inside the electromagnetic contactor 105. Through the b-contact switch 115, the operating voltage supplied from the second power supply 113 is applied to the first cylinder brake 116 and the second cylinder brake 117, each of which is an example of a rotation brake, that are provided for the upstream cylinder 102 and the downstream cylinder 103 independently, which rotate in synchronization with the rotation of the conveying drum 101.

The electromagnetic contactor 105, which is included in the drive control blocks according to the present embodiment, is also provided with the b-contact switch 115 in addition to the a-contact switch 111.

The first cylinder brake 116 and the second cylinder brake 117 are driven to operate by the voltage supplied from the second power supply 113, and have a configuration or structure similar to that of powder brakes. The voltage that is supplied from the second power supply 113 is, for example, a direct current (DC) of 24 volts (V). When the direct current of 24 volts is applied to the first cylinder brake 116 and the second cylinder brake 117, the electromagnetic coils provided for the first cylinder brake 116 and the second cylinder brake 117 generate a magnetic field and solidify the magnetic material. In other words, when a certain level of voltage is supplied to the first cylinder brake 116 and the second cylinder brake 117, the upstream cylinder 102 and the downstream cylinder 103 prevent the rotation of the conveying drum 101.

Under normal operating conditions where the emergency shut-down switch 109 is not touched or pressed down, the coil 110 provided for the electromagnetic contactor 105 is energized, and the a-contact switch 111 inside the electromagnetic contactor 105 is closed. Under these conditions, the voltage that is supplied from the power supply 104 is supplied to the motor driver 106 and the drum drive motor 108. When the emergency shut-down switch 109 is not touched or pressed down and the coil 110 provided for the electromagnetic contactor 105 is energized, and the b-contact switch 115 opens. Under these conditions, the voltage from the second power supply 113 is not supplied to the first cylinder brake 116 and the second cylinder brake 117.

When the emergency shut-down switch 109 is touched or pressed down and the coil 110 provided for the electromagnetic contactor 105 is nonenergized, the a-contact switch 111 inside the electromagnetic contactor 105 opens, and the b-contact switch 115 is closed. As a result, the power supply from the power supply 104 to the drum drive motor 108 is cut off, and the operation of the drum drive motor 108 is terminated.

As the power from the second power supply 113 is supplied to the first cylinder brake 116 and the second cylinder brake 117, the rotation of the upstream cylinder 102 and the downstream cylinder 103 is made slowly or stopped.

In other words, when the emergency shut-down switch 109 is touched or pressed down, the a-contact switch 111 is in a state of non-supply, which is an example of a second state, where the operating voltage that is supplied from the power supply 104, which is an example of a first power supply, is not supplied to the drum drive motor 108. In parallel with that, the b-contact switch 115 is in a state of supply, where the operating voltage supplied from the second power supply 113, which is an example of the second power supply, is supplied to the first cylinder brake 116 and the second cylinder brake 117.

The upstream cylinder 102 and the downstream cylinder 103 stops rotating when the first cylinder brake 116 and the second cylinder brake 117 to which operating voltage has been supplied start their operation. As described above, the upstream cylinder 102 and the downstream cylinder 103 rotate in mechanical synchronization with the rotation of the conveying drum 101. Due to such a configuration, when the rotation of the upstream cylinder 102 and the downstream cylinder 103 is stopped by the operation of the first cylinder brake 116 and the second cylinder brake 117, the rotation of the conveying drum 101 is mechanically prevented. As a result, the conveying drum 101 can mechanically be stopped without the need for control to stop the rotation of the conveying drum 101.

The rotation of the conveying drum 101 that has lost the driving source can instantly be terminated by preventing the rotation of the upstream cylinder 102 and the downstream cylinder 103.

The second power supply is not limited to a direct-current (DC) power supply, and is satisfactory as long as it is a power supply used to drive a rotation brake that terminates the rotation of the upstream cylinder 102 and the downstream cylinder 103 as described above.

The rotation brake is not limited to the first cylinder brake 116 and the second cylinder brake 117, and may be any device as long as it deactivates the rotation of the conveying drum 101 when the supply of operating voltage to the conveying drum 101 is interrupted.

In some embodiments, one cylinder brake is satisfactory, and one of first cylinder brake 116 and the second cylinder brake 117 may be omitted.

As described above, with the drum conveyance mechanism according to the above embodiments of the present disclosure, when abnormalities in the operation of control software operating in the control circuit 107 are detected and control signals from the control circuit 107 to the motor driver 106 become unstable unintentionally, a user can touch or press down the emergency shut-down switch 109 to terminate the rotation of the conveying drum 101 instantly.

Embodiments of the present disclosure are not limited to the above-described embodiments and modifications, and numerous additional modifications and variations are possible in light of the teachings. The technical contents included in the technical ideas described in the appended claims are included within the scope of the present disclosure and appended claims. It is therefore to be understood that the above-described embodiments of the present disclosure may be modified or practiced otherwise by those skilled in the art than as specifically described herein. Such modifications and variations are included in the technical scope of the appended claims.

By way of example, some aspects of the present disclosure are given below.

First Aspect

A drum conveyance mechanism conveys a sheet medium along an outer circumferential surface of a drum-shaped member, and the drum conveyance mechanism includes a first power supply to supply an operating voltage to a drive motor that is a driving source for the drum-shaped member to rotate, a driven roller to rotate as the drum-shaped member is driven to rotate, a second power supply to supply an operating voltage to a rotation brake that prevents rotation of the driven roller, and a power supply switch to switch a state of supply of the operating voltage from each of the first power supply and the second power supply.

Second Aspect

In the drum conveyance mechanism according to the first aspect, the power supply switch does not supply the operating voltage from the second power supply to the rotation brake in a first state where the operating voltage is supplied from the first power supply to the drive motor, and supplies the operating voltage from the second power supply to the rotation brake in a second state as a state of non-supply where the operating voltage from the first power supply to the drive motor is interrupted.

Third Aspect

In the drum conveyance mechanism according to the second aspect, the power supply switch switches the state of supply from the first state to the second state according to an external input.

Fourth Aspect

In the drum conveyance mechanism according to the third aspect, the power supply switch includes an a-contact switch having an input end and an output end, the input end of the a-contact switch coupled to the first power supply, the output end of the a-contact switch coupled to the drive motor, the a-contact switch closed in the first state, the a-contact switch opening in the second state, a b-contact switch having an input end and an output end, the input end of the b-contact switch coupled to the second power supply, the output end of the b-contact switch coupled to the rotation brake, the b-contact switch opening in the first state, the b-contact switch closed in the second state, and a coil to control opening and closing of the a-contact switch and the b-contact switch in response to the external input, and the coil is energized or nonenergized in response to the external input, to switch a state of supply of the operating voltage by the first power supply and the second power supply.

Fifth Aspect

In the drum conveyance mechanism according to any one of the first to fourth aspects, the first power supply is an alternating-current power supply, and the second power supply is a direct-current power supply to convert voltage applied by the alternating-current power supply into a direct-current voltage.

Sixth Aspect

In the drum conveyance mechanism according to any one of the first to fifth aspects, the rotation brake includes a plurality of rotation brakes disposed upstream from and downstream from the drum-shaped member in a conveyance direction of the medium.

Seventh Aspect

An image forming apparatus includes an image forming device to form an image on a sheet medium, and a conveyor to convey the medium to the image forming device, and the conveyor includes the drum conveyance mechanism according to any one of the first to sixth aspects.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A drum conveyance mechanism comprising:

a drum;

a drive motor configured to rotate the drum to convey a sheet medium along an outer circumferential surface of the drum;

a first power supply configured to supply an operating voltage to the drive motor;

a driven roller configured to rotate as the drum rotates;

a rotation brake configured to prevent rotation of the driven roller;

a second power supply configured to supply an operating voltage to the rotation brake; and a power supply switch configured to switch a state of supply of the operating voltage from the first power supply and the second power supply, wherein the power supply switch is further configured not to supply the operating voltage from the second power supply to the rotation brake in a first state where the operating voltage is supplied from the first power supply to the drive motor, and to supply the operating voltage from the second power supply to the rotation brake in a second state, as a state of non-supply, where the operating voltage from the first power supply to the drive motor is interrupted, and the power supply switch includes an a-contact switch having an input end and an output end, the input end of the a-contact switch coupled to the first power supply, the output end of the a-contact switch coupled to the drive motor, the a-contact switch closed in the first state, the a-contact switch opened in the second state, and a b-contact switch having an input end and an output end, the input end of the b-contact switch coupled to the second power supply, the output end of the b-contact switch coupled to the rotation brake, the b-contact switch opened in the first state, the b-contact switch closed in the second state.

2. The drum conveyance mechanism according to claim 1, wherein the power supply switch switches the state of supply from the first state to the second state according to an external input.

3. The drum conveyance mechanism according to claim 2, wherein the power supply switch further includes a coil configured to control opening and closing of the a-contact switch and the b-contact switch in response to the external input, wherein the coil is energized or nonenergized in response to the external input, to switch the state of supply of the operating voltage from the first power supply and the second power supply.

4. The drum conveyance mechanism according to claim 1, wherein the first power supply is an alternating-current power supply, and wherein the second power supply is a direct-current power supply to convert voltage applied by the alternating-current power supply into a direct-current voltage.

5. The drum conveyance mechanism according to claim 1, further comprising a pair of rotation brakes including the rotation brake, wherein the pair of rotation brakes are disposed upstream from and downstream from the drum in a conveyance direction of the sheet medium.

6. An image forming apparatus comprising:

an image forming device to form an image on a sheet medium; and a conveyor to convey the sheet medium to the image forming device, the conveyor including a drum conveyance mechanism including
a drum;
a drive motor configured to rotate the drum to convey a sheet medium along an outer circumferential surface of the drum;
a first power supply configured to supply an operating voltage to the drive motor,
a driven roller configured to rotate as the drum rotates,
a rotation brake configured to prevent rotation of the driven roller,
a second power supply configured to supply an operating voltage to the rotation brake, and
a power supply switch configured to switch a state of supply of the operating voltage from the first power supply and the second power supply, wherein
the power supply switch is further configured
not to supply the operating voltage from the second power supply to the rotation brake in a first state where the operating voltage is supplied from the first power supply to the drive motor, and
to supply the operating voltage from the second power supply to the rotation brake in a second state, as a state of non-supply, where the operating voltage from the first power supply to the drive motor is interrupted, and
the power supply switch includes
an a-contact switch having an input end and an output end, the input end of the a-contact switch coupled to the first power supply, the output end of the a-contact switch coupled to the drive motor, the a-contact switch closed in the first state, the a-contact switch opened in the second state, and
a b-contact switch having an input end and an output end, the input end of the b-contact switch coupled to the second power supply, the output end of the b-contact switch coupled to the rotation brake, the b-contact switch opened in the first state, the b-contact switch closed in the second state.

* * * * *